L. W. CHUBB.
CIRCUIT INTERRUPTING SYSTEM.
APPLICATION FILED MAY 3, 1916.
1,287,281.
Patented Dec. 10, 1918.
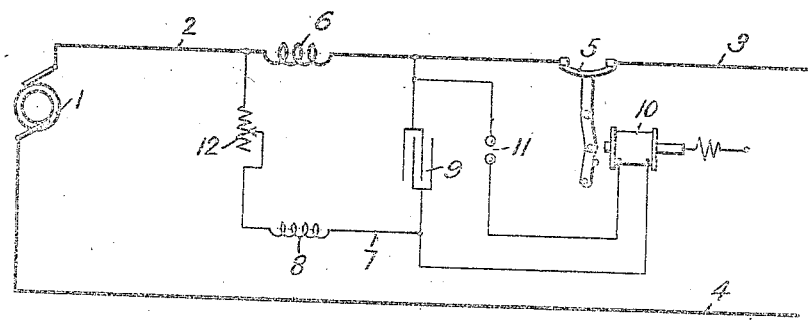
WITNESSES:
INVENTOR
Lewis W. Chubb
BY
ATTORNEY

UNITED STATES PATENT OFFICE.

LEWIS W. CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

CIRCUIT-INTERRUPTING SYSTEM.

1,287,231.

Specification of Letters Patent. Patented Dec. 10, 1918.

Application filed May 3, 1916. Serial No. 95,053.

*To all whom it may concern:*

Be it known that I, LEWIS W. CHUBB, a citizen of the United States, and a resident of Pittsburgh, in the county of Allegheny and State of Pennsylvania, have invented a new and useful Improvement in Circuit-Interrupting Systems, of which the following is a specification.

My invention relates to circuit-interrupting systems and particularly to circuit interrupters that are adapted to open at the instant the instantaneous value of the current traversing the same is substantially zero.

The object of my invention is to provide a circuit interrupter of the above indicated character that shall have means for energizing its trip coil a sufficient time interval before the instantaneous value of the current, having a predetermined maximum value, passes through zero to permit the circuit interrupter to open when the instantaneous value of the current is substantially zero.

It is a well known fact that, if a circuit interrupter is tripped when the instantaneous value of the current traversing it is zero, no arcing will occur and a relatively small interrupter may be used. However, if a tripping device is operated when the current traversing the circuit interrupter has a predetermined value, there is a likelihood that the interrupter will open when the instantaneous value of the current is other than zero. In view of this I connect a series-resonant circuit to the main circuit and I connect a spark gap in circuit with a trip coil. The trip-coil circuit is connected in shunt relation to the condensive portion of the resonant circuit, and the phase-angular relation of the condensive portion is so shifted that its maximum voltage will occur an interval of time before the instantaneous value of the current that traverses the main circuit passes through zero. This time interval is, of course, determined by the speed of operation of the interrupter.

The single figure of the accompanying drawing is a diagrammatic view of an electric circuit embodying my invention.

A generator 1 supplies current to a circuit 2 comprising conductors 3 and 4. A circuit interrupter 5 is connected in circuit with the conductor 3 of the circuit 2 for the purpose of opening the same when the current reaches a predetermined value. While I have shown a circuit interrupter as connected in only one conductor of the circuit, it will, of course, be understood that both conductors of the circuit may be protected in the same manner.

An impedance coil 6 having a relatively small impedance is connected in circuit with the conductor 3, and a series-resonant circuit 7, comprising a reactor 8, a condenser 9 and a variable resistor 12, is connected in shunt relation to the impedance coil 6. A trip coil 10 is connected in series relation to a spark gap 11 and the circuit, thus constituted, is connected in shunt relation to the condenser 9.

If the impedance coil 6 were entirely non-inductive, the potential across the condenser 9 would be in quadrature with, and proportional to, the current traversing the conductor 3, hence, its maximum value would occur at the time that the instantaneous value of the current traversing the conductor 3 is zero. Therefore, if the spark gap 11 is so set that it will break down when this predetermined maximum value is reached, the trip coil 10 will be energized and the circuit interrupter 5 will open. However, since the circuit interrupter 5 operates a definite time after the trip coil 10 is energized, the instantaneous value of the current traversing the circuit 3 may be other than its zero value when the circuit interrupter 5 is tripped.

If the impedance coil 6 is inductive, the phase relation of the voltage of the condenser 9 may be so advanced that its maximum value will occur a time interval before the instantaneous zero value of the current that traverses the circuit 3. Thus, if this phase-angular shift is so proportioned that it corresponds to the time required for the circuit interrupter 5 to operate, the circuit interrupter will open when the instantaneous value of the current traversing it is zero, and, consequently, the circuit interrupter 5 may be relatively small and inexpensive to construct. Since the circuit 2 is adapted to be opened at the zero point in its current wave, no surges or other similar disturbances will occur.

The time required for a circuit interrupter to operate from the impulse or flow of current in its trip coil to the opening of its contact members is substantially constant if the electrical impulse or flow of current in the trip coil is always the same. Since the electrical impulse or current that traverses the trip coil 10 is the discharge of the condenser 9 of definite capacitance which is charged to a voltage equal to the sparking potential of the definite spark gap 11, the time required for the interrupter to open is always the same.

It is a well known fact that, upon sudden short circuits and overloads, it is desirable to open the circuit 2 only after the reactions in the generator 1 have reduced its field current and any unsymmetrical transient in the circuit 2 has reached a symmetrical periodic value. Since the interrupter 5 is adapted to trip only after the resonant circuit 7 has stored sufficient energy to raise the potential of the condenser 9 to the spark potential of the spark gap 11, it is assured that the interrupter will not trip upon the first impulse of a sudden short circuit or overload.

The variable resistor 12 is utilized for producing such a dull resonance in the circuit 7 that the interrupter 5 will not be tripped by the usual variations in the frequency of the circuit. The resistor 12 may be used for adjusting the interrupter 5 to trip at various values of overload and for manual tripping. If the resistance of the resistor 12 is decreased, an increased current will traverse the circuit 7, and the ratio of the potential of the condenser 9 and the current that traverses the circuit may be varied without changing the value of the impulse or current that traverses the trip coil.

While I have described my invention with respect to the tripping of a circuit interrupter when the instantaneous value of the current traversing it is substantially zero, I do not limit my invention to tripping a circuit interrupter or to the particular instantaneous value at which it is to be tripped. Neither do I limit my invention to the particular means for shifting the phase-angular relation of the portions of the resonant circuit, as many modifications and adaptations may be made in my invention without departing from the spirit and scope of the same as set forth in the appended claims.

I claim as my invention:

1. In an electric circuit, the combination with a circuit interrupter and a trip coil, of an impedance coil connected in series with the circuit, a series resonant circuit connected in shunt relation to the said impedance coil, and a spark gap connected in series with the trip coil, the circuit, thus constituted, being connected in shunt relation to a portion of the resonant circuit, said spark gap being adapted to break down when a predetermined current traverses the circuit and a predetermined interval of time before the current wave passes through its zero value.

2. In an electric circuit, the combination with a circuit interrupter and a trip coil, of a series-resonant circuit operatively connected to the electric circuit, a spark gap operatively connected to the trip coil, the trip-coil circuit being connected to the condensive portion of the resonant circuit, and means for so advancing the phase-angular relation of the condensive portion of the resonant circuit that the spark gap will break down a predetermined interval of time before the instantaneous value of the current traversing the electric circuit reaches its zero value.

3. In an electric circuit, the combination with a circuit interrupter and a trip coil, of a series-resonant circuit operatively connected to the electric circuit, a spark gap operatively connected to the trip coil, the trip-coil circuit being connected to the condensive portion of the resonant circuit, and means for so advancing the phase-angular relation of the condensive portion of the resonant circuit that the spark gap will break down a sufficient interval of time before the instantaneous value of the current traversing the electric circuit reaches its zero value to permit the circuit interrupter to be tripped when that condition obtains.

4. The combination with an alternating-current circuit, of means for producing an inductive-impedance drop therein, a series resonant circuit so connected that said drop is impressed thereon, an electrically operated circuit-interrupting device in said alternating-current circuit, and means for operating said device in accordance with the voltage across one of the elements of said resonant circuit.

5. The combination with an alternating-current circuit, of means for producing an inductive-impedance drop therein, a series resonant circuit comprising a condenser and an inductive reactor and so connected that said drop is impressed thereon, an electrically operated circuit-interrupting device in said alternating-current circuit, and means for operating said device in accordance with the voltage across said condenser.

6. The combination with an alternating-current circuit, of means for producing an inductive-impedance drop therein, a series resonant circuit so connected that said drop is impressed thereon, an electrically operated circuit-interrupting device in said alternating-current circuit, means providing a spark-gap, and means for impressing the voltage across an element of said resonant circuit upon the operating winding of said device through said spark-gap.

7. The combination with an alternating-current circuit, of means for producing an inductive-impedance drop therein, a series resonant circuit comprising a condensive reactor and an inductive reactor, means for so connecting said resonant circuit that said voltage drop is impressed thereupon, an electrically operated circuit-interrupting device in said alternating-current circuit, means providing a spark-gap, and means for applying the voltage across said condensive reactor to the operating coil of said device through said spark-gap.

8. The combination with an alternating-current circuit, of means for producing a voltage drop therein, a series resonant circuit including a damping resistor so connected that said drop is impressed thereon, an electrically operated circuit-interrupting device in said alternating-current circuit, and means for operating said device in accordance with the voltage across one of the elements of said resonant circuit.

9. The combination with an alternating-current circuit, of means for producing a voltage drop therein, a series resonant circuit comprising a condenser, an inductive reactor and a damping resistor so connected that said drop is impressed thereon, an electrically operated circuit-interrupting device in said alternating-current circuit, and means for operating said device in accordance with the voltage across said condenser.

10. The combination with an alternating-current circuit, of an electrically-tripped circuit-interrupting device inserted therein and requiring a predetermined period of time for its operation after initial energization, means for deriving an alternating electromotive force from said circuit substantially proportional to the load-current flow in said circuit and having a maximum value at substantially said period of time prior to each instant of zero current flow in said circuit, and means for supplying an operating impulse from said derived electromotive force to the tripping mechanism of said interrupting device at each crest of said derived electromotive force when the derived electromotive force exceeds a predetermined value, whereby said device is caused to interrupt said circuit at or near times of zero current flow.

11. The combination with an alternating-current circuit, of an electrically-tripped circuit-interrupting device inserted therein and requiring a predetermined period of time for its operation after initial energization, means for deriving an alternating electromotive force from said circuit substantially proportional to the load-current flow in said circuit and having a maximum value at substantially said period of time prior to each instant of zero current flow in said circuit, and a circuit including a spark-gap for supplying an operating impulse from said derived electromotive force to the tripping mechanism of said interrupting device when said electromotive force exceeds a predetermined amount, the setting of said spark-gap being such as to permit the flow of tripping current only at the crests of the derived electromotive force waves attendant upon the flow of abnormal current in said alternating-current circuit, whereby said device is caused to interrupt said alternating-current circuit at or near a point of zero current flow therein.

In testimony whereof, I have hereunto subscribed my name this 28th day of April, 1916.

LEWIS W. CHUBB.